(12) United States Patent
Morselli

(10) Patent No.: US 8,942,860 B2
(45) Date of Patent: Jan. 27, 2015

(54) WIRELESS COMMUNICATION SYSTEM FOR AGRICULTURAL VEHICLES

(75) Inventor: Riccardo Morselli, San Vito di Spilamberto (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/983,608

(22) PCT Filed: Feb. 14, 2012

(86) PCT No.: PCT/EP2012/052508
§ 371 (c)(1),
(2), (4) Date: Oct. 14, 2013

(87) PCT Pub. No.: WO2012/110508
PCT Pub. Date: Aug. 23, 2012

(65) Prior Publication Data
US 2014/0039719 A1    Feb. 6, 2014

(30) Foreign Application Priority Data
Feb. 16, 2011    (IT) .............................. TO2011A0133

(51) Int. Cl.
| | | |
|---|---|---|
| *G06F 7/00* | (2006.01) | |
| *G08G 99/00* | (2006.01) | |
| *A01B 69/04* | (2006.01) | |
| *A01B 79/00* | (2006.01) | |
| *G05D 1/02* | (2006.01) | |

(52) U.S. Cl.
CPC .............. *G08G 99/00* (2013.01); *A01B 69/008* (2013.01); *A01B 79/005* (2013.01); *G05D 1/0293* (2013.01); *G05D 1/0278* (2013.01); *G05D 2201/0201* (2013.01)
USPC ................... 701/1; 701/41; 701/50; 701/466; 56/56; 111/174; 137/869

(58) Field of Classification Search
CPC .... A01B 69/008; A01B 79/005; G01C 21/20; A01C 7/081; A01C 7/105
USPC ................... 701/41, 50, 466; 56/56; 111/174; 137/869
See application file for complete search history.

(56) References Cited

U.S. PATENT DOCUMENTS

| | | | |
|---|---|---|---|
| 6,525,276 B1* | 2/2003 | Vellidus et al. ................ | 177/136 |
| 7,860,628 B2* | 12/2010 | Lange .............................. | 701/50 |
| 8,359,141 B1* | 1/2013 | Lange .............................. | 701/50 |
| 2004/0088330 A1* | 5/2004 | Pickett et al. ............... | 707/104.1 |
| 2006/0282205 A1* | 12/2006 | Lange .............................. | 701/50 |
| 2012/0227647 A1* | 9/2012 | Gelinske et al. ............... | 111/174 |
| 2013/0041549 A1* | 2/2013 | Reeve et al. ..................... | 701/28 |
| 2013/0211628 A1* | 8/2013 | Thurow et al. .................... | 701/2 |

* cited by examiner

*Primary Examiner* — James P. Trammell
(74) *Attorney, Agent, or Firm* — Sue C. Watson

(57) ABSTRACT

A wireless communication system for agricultural vehicles, in which each vehicle has a global positioning system (GPS), a multi-channel transmitter/receiver module having a limited communication range, and a signal processor connected to the transmitter/receiver module. The transmitter is controlled by the signal processor to transmit on a predetermined communication channel a signal comprising a unique vehicle identifier and a signal indicating the current positional coordinates of the vehicle. The signal processor also analyzes the signals received from other vehicles within the communication range and determines from the identifier and the positional coordinates data when another vehicle is ready to perform a joint operation with the vehicle. Prior to initiation of a joint operation, the communication system is switched to a different communication channel.

12 Claims, 5 Drawing Sheets

|  | Serviced Vehicle | | | | |
|---|---|---|---|---|---|
| Provider Vehicle | | Vehicle 1 | Vehicle 2 | Vehicle 3 | Vehicle ... | Vehicle N |
| | Vehicle 1 | NO | NO | NO | ... | NO |
| | Vehicle 2 | YES | NO | | ... | YES |
| | Vehicle 3 | YES | | NO | ... | YES |
| | Vehicle ... | ... | ... | ... | ... | ... |
| | Vehicle N | NO | NO | NO | ... | NO |

Fig.4 A

|  | Serviced Vehicle | | | | |
|---|---|---|---|---|---|
| Provider Vehicle | | Vehicle 1 | Vehicle 2 | Vehicle 3 | Vehicle ... | Vehicle N |
| | Vehicle 1 | NO | NO | NO | ... | NO |
| | Vehicle 2 | 2 | NO | | ... | 4 |
| | Vehicle 3 | 3 | | NO | ... | 5 |
| | Vehicle ... | ... | ... | ... | ... | ... |
| | Vehicle N | NO | NO | NO | ... | NO |

Fig.4 B

|  | | Serviced Vehicle | | | | |
|---|---|---|---|---|---|---|
|  | | Vehicle 1 | Vehicle 2 | Vehicle 3 | Vehicle ... | Vehicle N |
| Provider Vehicle | Vehicle 1 | NO | NO | NO | ... | NO |
| | Vehicle 2 | 2,3 | NO | | ... | 4,3 |
| | Vehicle 3 | 3,4 | | NO | ... | 5,2 |
| | Vehicle ... | ... | ... | ... | ... | ... |
| | Vehicle N | NO | NO | NO | ... | NO |

Fig. 4 C

WIRELESS COMMUNICATION SYSTEM FOR AGRICULTURAL VEHICLES

CROSS REFERENCE TO RELATED APPLICATIONS

This application is the US National Stage filing of International Application Serial No. PCT/EP2012/052508, entitled "WIRELESS COMMUNICATION SYSTEM FOR AGRICULTURAL VEHICLES," filed Feb. 14, 2012, which claims priority to Italian Application Serial No. TO2011A000133, filed Feb. 16, 2011, each of which is incorporated by reference herein in its entirety for all purposes.

FIELD OF THE INVENTION

The present invention relates to a wireless communication system for agricultural vehicles.

BACKGROUND OF THE INVENTION

It is not practical for a combine harvester to return to a grain storage location every time its grain tank is full. Instead, an unloading tractor is driven alongside the harvester and the grain is unloaded from its grain tank while both vehicles are moving. As there may be several harvesters operating near one another and several unloading tractors servicing them by ferrying the grain from the harvesters to the storage location, coordinating the movement of all these vehicles is a complex logistical exercise that can be better performed if the vehicles are able to communicate wirelessly with one another.

The communication system between the vehicles needs to take the following requirements into account, namely:

1. The wireless communication performance must not be significantly affected by multiple vehicles in the same transmission area (e.g. bandwidth reduction due to multiple communications),
2. Detection (discovery) of the vehicles that may provide/request support. For example, a combine harvester may request to be unloaded, and a tractor may provide the unloading service.
3. The operators must not be constantly distracted and irritated by messages enquiring with which vehicle they would like to work. Instead the system should be as autonomous as possible in detecting which pair of vehicles may cooperate in a joint operation.
4. The communication bandwidth must not be significantly affected by multiple connection procedures between vehicles moving in and out of the transmission/reception area.

U.S. Pat. No. 7,555,283, which is believed to represent the closest prior art to the present invention, is directed to a communication system for mobile and stationary devices, which act as receivers and sources of information, respectively, comprising at least one transmitter/receiver unit provided for the mobile and stationary devices and having a defined transmission/reception range, and also formed so that at least partial overlap of the transmission/reception ranges of the mobile and/or stationary devices results in accidental communication between the mobile and/or stationary devices, and this accidental communication changes to a targeted communication, wherein communication comprises a direct exchange of information between the sources and receivers and the communication system is formed so that during the accidental communication, an application context between the communicating mobile and/or stationary devices is credit (SIC) and, if an application context of this type is not present, the accidental communication is terminated.

The latter patent classifies individual communications between two devices as "accidental" and "targeted". An accidental communication is one between two devices that may or may not be intending to cooperate with one another. If the exchanged data meets certain criteria defined by an "application" then an accidental communication changes into a targeted communication. The unloading of harvesters is given as one example of an "application" and in this example, once a targeted communication is commenced, the unloading tractor is controlled by the harvester.

Of the four requirements set forth above, the communication system of U.S. Pat. No. 7,555,283 meets those numbered 2 and 3, but it suffers from the disadvantage of overloading the available bandwidth. The resultant risk of interference makes it unsafe to have several targeted communications taking place simultaneously on the same communication channel.

SUMMARY OF THE INVENTION

According to a first aspect of the present invention, there is provided a wireless communication system for agricultural vehicles, wherein each vehicle has a global positioning system (GPS), a multi-channel transmitter/receiver (Tx/Rx) module having a limited communication range, and a signal processor connected to the Tx/RX module, wherein the transmitter is controlled by the signal processor to transmit on a predetermined communication channel a signal comprising, at least, a unique vehicle identifier and a signal indicating the current positional co-ordinates of the vehicle and wherein the signal processor is operative to analyse the signals received from other vehicles within the communication range and to determine from the identifier and the positional co-ordinates data when another vehicle is ready to perform a joint operation with the vehicle, characterised in that, prior to initiation of a joint operation, the communication system is switched to a different communication channel.

In accordance with a second aspect of the invention, there is provided a method of wireless communication between agricultural vehicles, wherein each vehicle (10,12) has a global positioning system (GPS), a multi-channel transmitter/receiver (Tx/Rx) module having a limited communication range, and a signal processor connected to the Tx/RX module, the method comprising the steps of transmitting from each vehicle on a predetermined communication channel a signal that includes, at least, a unique vehicle identifier and a signal indicating the current positional co-ordinates of the vehicle, and analysing in each vehicle signals received from other vehicles within the communication range to determine from the identifier and the positional co-ordinates data when another vehicle is ready to perform a joint operation with the vehicle, characterised by switching to another communication channel prior to initiation of a joint operation.

In the invention, the general broadcast channel on which vehicle identifiers and positional data are transmitted is not used as a control channel once a joint operation has been commenced. Interference during a joint operation is thus minimised and the general broadcast channel is kept clear for other vehicles using the communication system. The invention thus better meets the requirements numbered 1 and 4 above.

In the communication system of U.S. Pat. No. 7,555,283, the vehicle operators have no control over when an accidental communication becomes a targeted communication. For example, in one application, the "application" is intended to avoid collisions and can activate the braking system of a vehicle without driver intervention.

In the preferred embodiment of the invention, when and only when, two vehicles are ready to perform a joint operation the operators of both vehicles receive notifications from the wireless communication system, and the joint operation is commenced only after receipt of an instruction from at least one of the two vehicle operators.

In the preferred embodiment of the invention, initiation of a joint operation requires operator intervention and control of the unloading tractor, for example, cannot be taken away from its operator without authorisation.

The preferred embodiment of the invention meets the third requirement above because the operator is not constantly troubled by signals informing him what other vehicles in the vicinity are doing. The only time that the operator is alerted is when a joint operation is about to be commenced whereupon his instructions are requested before the joint operation commences.

Advantageously, to minimise further the number of signals on the broadcast channel, each vehicle only transmits its identifier and positional coordinates when it is ready to perform a joint operation with another vehicle. Thus, for example, a harvester will only transmit on the broadcast channel when its grain tank is full and a tractor will only transmit when a signal on the broadcast channel it has unloading capacity for a harvester.

As an alternative, each vehicle may transmit at all times but the transmitter signal may indicate the current vehicle status, that it to say whether or nor it is available to perform a joint operation within another vehicle.

For an unloading tractor and a harvester to cooperate, they need to be travelling at the same velocity (i.e. direction and speed). It is therefore preferred for each vehicle to transmit velocity data in addition to positional data. Though this is not essential, because both speed and direction can be computed from the position coordinates, transmitting velocity data reduces the amount of processing that needs to be performed by the signal processors and the provides more current and more accurate velocity information.

The invention has been described above by reference to the example of the joint operation being the unloading of a harvester. This need not however be the case and the invention can relate to any jointly performed operation where data needs to be exchanged between two vehicle regarding the operation being performed jointly.

BRIEF DESCRIPTION OF THE DRAWINGS

The invention will now be described further, by way of example, with reference to the accompanying drawings, in which:

FIG. 4A is a first example of a service table;

FIG. 4B is a second example of a service table comprising a preferred channel; and FIG. 4C is a third example of a service table comprising also a further preferred channel.

DETAILED DESCRIPTION OF THE PREFERRED EMBODIMENT

Figure 1:
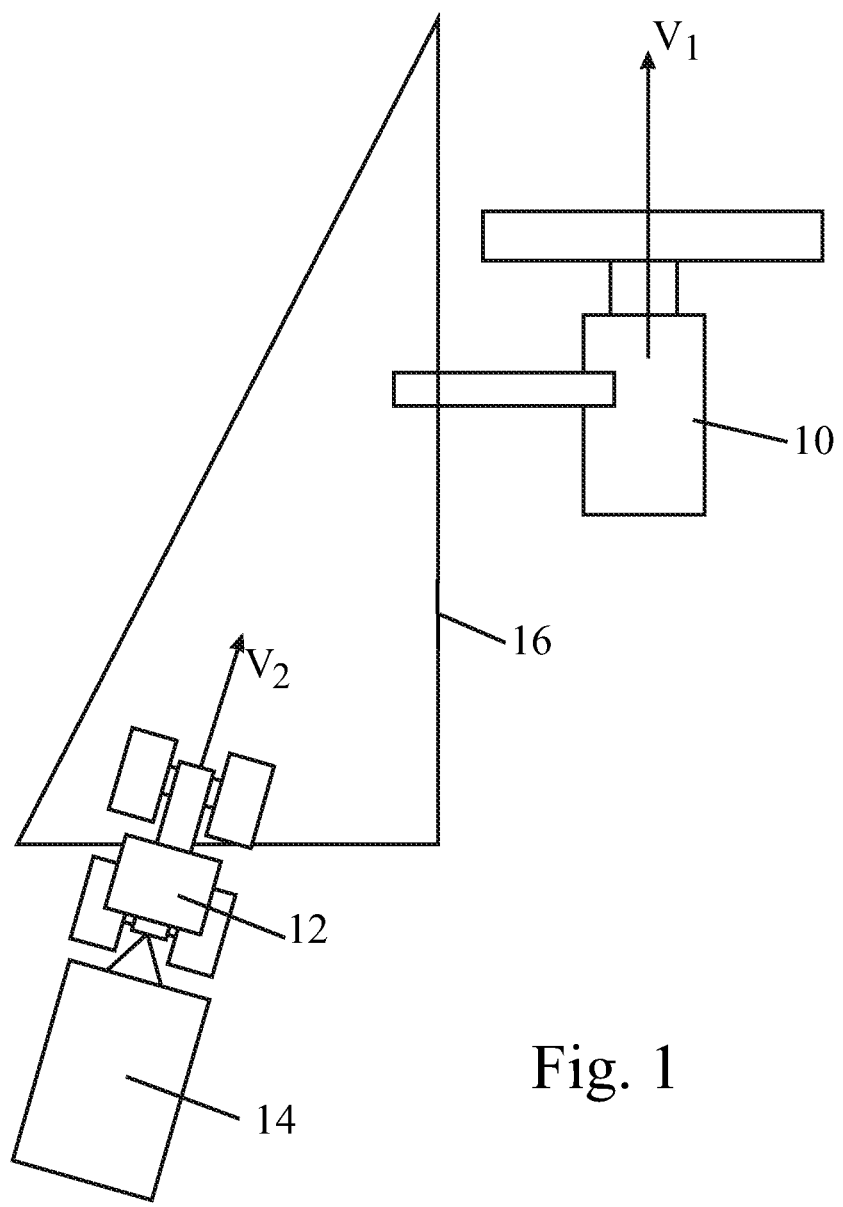
FIG. 1 is a schematic representation showing an unloading tractor travelling with an acceptable velocity and correctly located relative to a harvester to commence an unloading operation.

FIG. 1 shows a harvester 10 travelling with velocity V1 and a tractor 12 towing an unloading trailer 14 travelling with a velocity V2. Provided that velocities V1 and V2 lie within a specified range from one another (i.e. any speed and direction differences are within specified limits) and the tractor is travelling within a predetermined service zone 16 relative to the harvester, shown in FIG. 1 as a large triangle, then a joint operation of unloading the harvester may be commenced. Under any other conditions, i.e. if the speeds or directions differ too greatly or if the tractor is not in the correct position relative to the harvester then the joint operation cannot be commenced.

In the present invention, each of the harvester 10 and the tractor 12 has a Tx/Rx module connected to a signal processor which is also connected to a GPS system. At least while the harvester needs unloading and the tractor 12 has unloading capacity on board its trailer 14, they each transmit a signal on a general broadcast channel which identifies the vehicle and indicates its GPS coordinated (longitude and latitude). The transmitted signals may also include an indication of the velocity of the vehicle and its current status. The signal processors analyse received signals and determine if the conditions represented in FIG. 1 are satisfied.

At this time, the operators of both vehicle are notified that the two vehicles are in position for a joint operation to be commenced. When at least one (and more preferably both) of the operators confirms that the joint operation may be commenced, the two Tx/Rx switch to an agreed different channel that is now used to send control signals from the harvester to the tractor. This allows the harvester to steer and control the speed of the tractor so that unloading can be carried out safely.

The agreed different channel is first verified that it is free of any communication and when occupied a further different channel is selected or negotiated.

On completion of the unloading, control of the tractor is returned to the tractor operator who may then service another harvester or return to a grain storage location if the full capacity of its trailer is exhausted. In the mean time both vehicles start listening to the general broadcast channel again. However, both vehicles may also continuously listen to the general broadcast channel, also during the joint operation.

Figure 2:
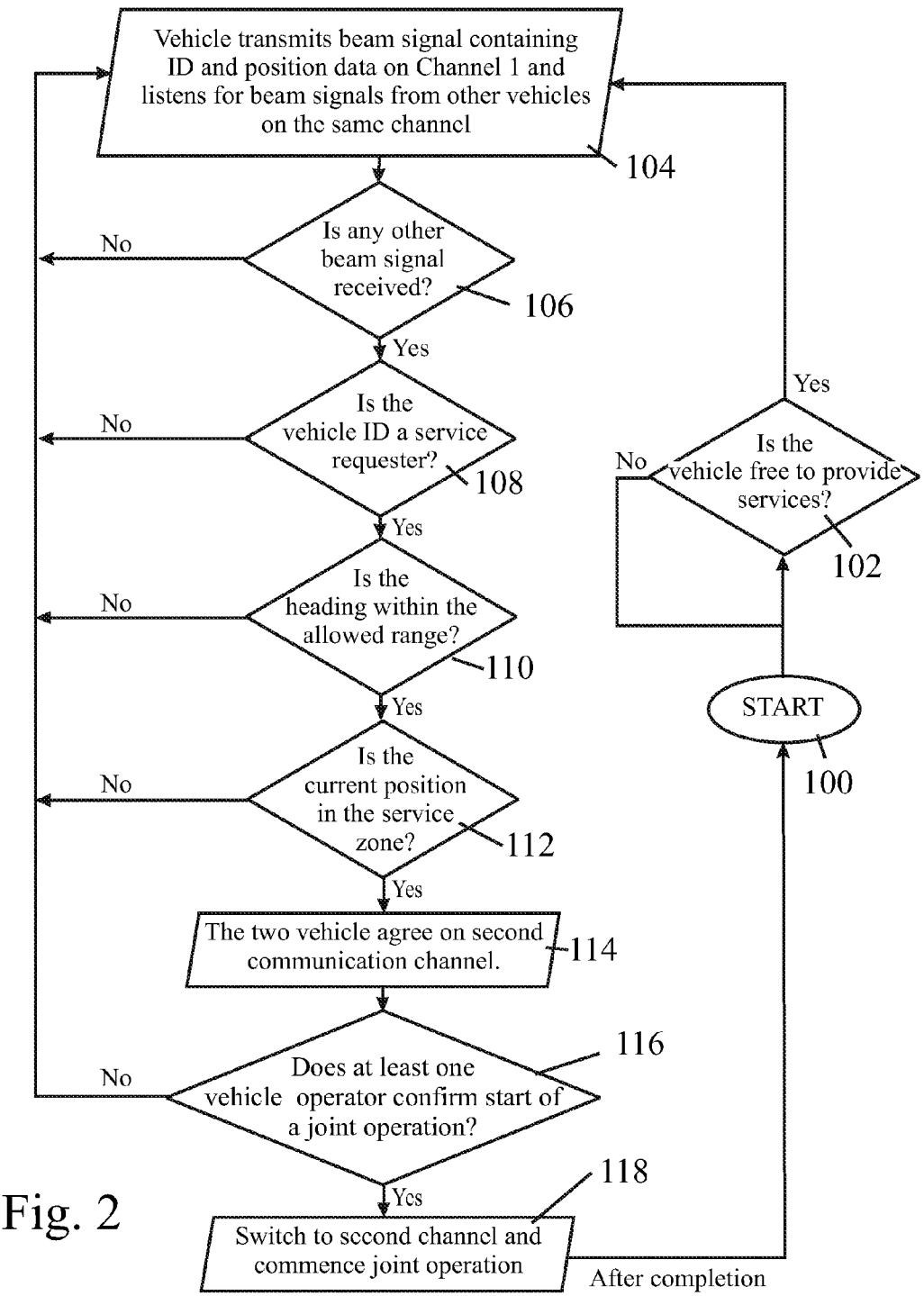
FIGS. 2 and 3 are flow charts setting out the steps and decisions performed by the signal processors of the unloading tractor and the harvester, respectively.
Figure 3:
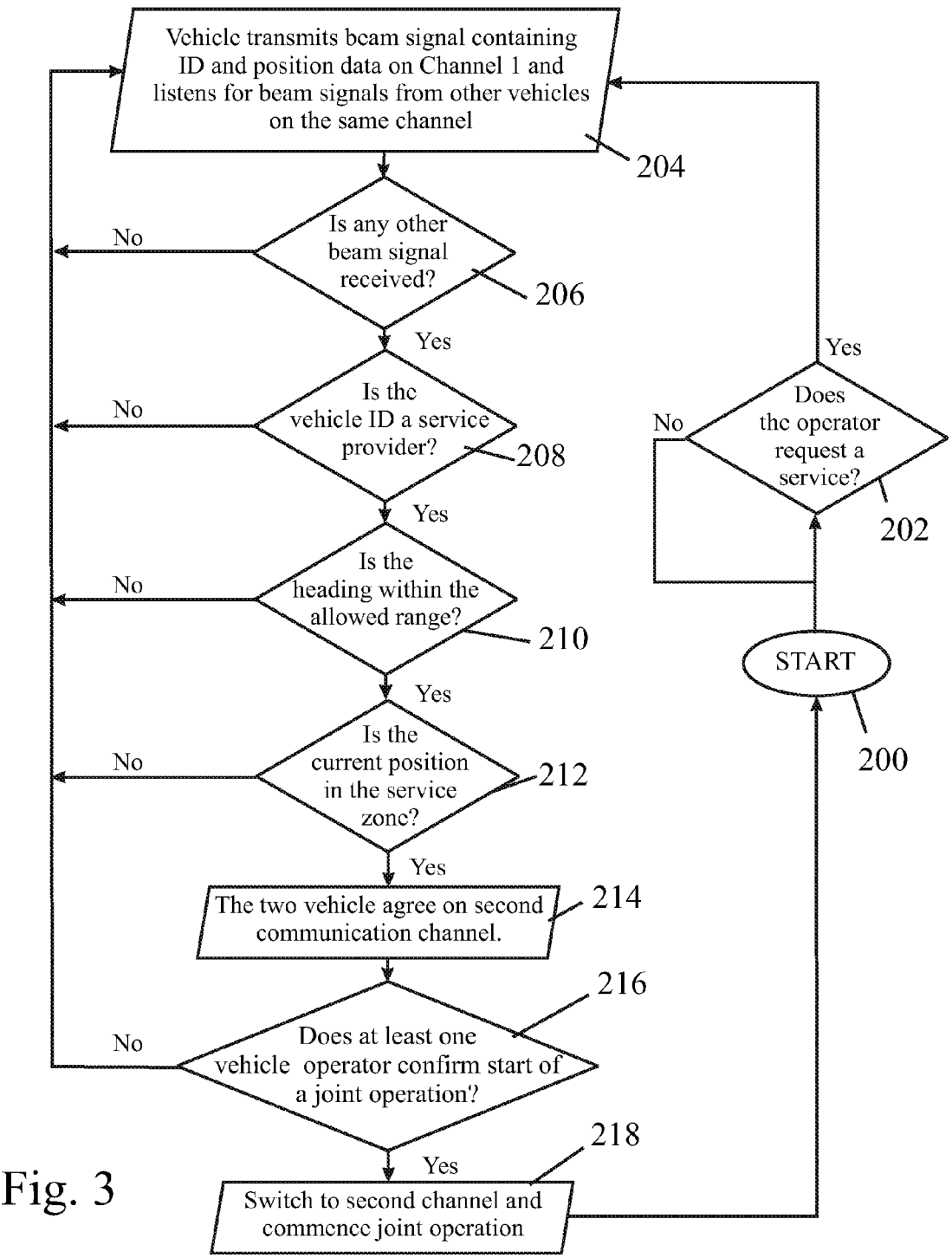

The flow charts of FIGS. 2 and 3 show the steps implemented in software in the signal processors of the tractor 12 and the harvester 10, respectively.

Referring first to FIG. 2, following the start 100 of the program, a check is made in decision step 102 to determine the current status of the tractor, i.e. if it has capacity to service a harvester. The status can be determined either by a signal from the operator or by a sensor on the trailer.

Assuming that it is available to perform an unloading operation, in step 104 the tractor transmits a signal on the general broadcast channel and listens for the corresponding signals from other vehicles in the vicinity. The signals contain a vehicle identifier and position data and may also contain velocity and status information.

In step 106, the processor determines if any other vehicles are in the communication range and goes on listening to the general broadcast channel by returning to step 104 until a vehicle comes within range.

Each signal processor includes a service table in which all the vehicle identifiers are stored together with other information on the vehicles that may be relevant when performing a joint operation. FIGS. 4 A, B and C show a representation of such service table. All service tables comprise identifiers for vehicles that may engage in a joint operation, as in FIG. 4A. From this data, the processor can determine in step 108 if the other vehicle is a service requester. Signals from non-requesting vehicles are disregarded but when a signal is received from a harvester then the process continues to step 110 in which it is determined if the headings of the two vehicles are within an allowed range of each other. The velocity of the other vehicle can either be computed from its present and past position data or it may be transmitted by the other vehicle in addition to its identifier and position coordinates.

Once it has been established that the vehicles are travelling in the right direction, it is determined in step 112 if the tractor is in the zone 16 relative to the harvester. If any one of the conditions in decision steps 106 to 112 is not satisfied, the program returns to step 104 and listens out for a vehicle that does meet these conditions.

When eventually the tractor 12 is in the position shown in FIG. 1 and all the conditions of steps 106 to 112 are satisfied, the two processors agree in step 114 on a different control channel and indicate to their respective operators that the vehicles are ready to commence a joint operation.

In step 116, the processor waits for at least one of the two operators to give the go ahead for the joint operation to commence. When this happens in step 118, both processors switch to the agreed other communication channel and automatic control of the tractor by the harvester is carried out over this channel. After completion, which may be indicated either by one of the operators or a sensor, the automatic control of the tractor is discontinued and a new cycle is commenced by returning to the start 100.

When the agreed other communication channel is occupied by other vehicles a switch to a further other communication channel is made. The service table may comprise information on a preferred other communication channel between certain vehicle combinations and may even comprise information on further preferred communication channels, as in FIGS. 4B and 4C. When also said preferred channels are occupied or there is no list of preferred channels, the vehicles may negotiate another communication channel on the general broadcast channel.

The operation of the processor in the harvester is essentially analogous and for ease of understanding similar references have been allocated to the various steps, save that 100 has been added to each reference numeral.

Hence, referring to FIG. 3, following the start 200 of the program, a check is made in decision step 202 to determine the current status of the harvester, i.e. is its grain tank approaching full capacity. The status can be determined either by a signal from the operator or by a sensor in the grain tank.

Assuming that the harvester requires servicing an unloading operation, in step 204 the harvester transmits a signal on the general broadcast channel and listens for the corresponding signals from other vehicles in the vicinity.

In step 206, the processor determines if any other vehicles are in the communication range and goes on listening to the general broadcast channel by returning to step 204 until a vehicle comes within range.

The processor determines in step 208 from its stored table if the other vehicle is a service provider. Signals from vehicles that are not service providers are disregarded but when a signal is received from an unloading tractor then the process continues to step 210 in which it is determined if the headings of the two vehicles are within an allowed range of each other.

Once it has been established that the vehicles are travelling in the right direction, it is determined in step 212 if the tractor is in the zone 16 relative to the harvester. If any one of the conditions in decision steps 206 to 212 is not satisfied, the program returns to step 204 and listens out for a vehicle that does meet these conditions.

When eventually the tractor 12 is in the position shown in FIG. 1 and all the conditions of steps 206 to 212 are satisfied, the two processors agree in step 214 on a different control channel and indicate to their respect operators that the vehicles are ready to commence a joint operation.

In step 216, the processor waits for at least one of the two operators to give the go ahead for the joint operation to commence. When this happens in step 218, both processors switch to the agreed other communication channel and automatic control of the tractor by the harvester is carried out over this channel. After completion, which may be indicated either by one of the operators or a sensor, the automatic control of the tractor is discontinued and a new cycle is commenced by returning to the start 200.

When the agreed other communication channel is occupied by other vehicles a switch to a further other communication channel is made. The service table may comprise information on a preferred other communication channel between certain vehicle combinations and may even comprise information on further preferred communication channels, as in FIGS. 4B and 4C. When also said preferred channels are occupied or there is no list of preferred channels, the vehicles may negotiate another communication channel on the general broadcast channel.

The radio communications between vehicles all take place in the background and do not affect the vehicle operators. The operators may separately communicate with one another in any suitable manner to indicate that a service is requested. For example, they may communicate with one another by radio, by light signal or by the harvester extending its unloading arm. The tractor operator answering the service call will then manoeuvre into position of the joint operation and once the tractor is approximately in the correct place and travelling in the right direction, the communication system will indicate to the operators that a joint operation may be commenced and thereafter a single command from one of the operators is all that is required for the joint operation of unloading the grain tank of the harvester to take place automatically.

The invention claimed is:

1. A wireless communication system for agricultural vehicles, each vehicle including a global positioning system (GPS), a multi-channel transmitter/receiver module having a limited communication range, and a signal processor connected to the transmitter/receiver module, wherein
   the transmitter is controlled by the signal processor and the transmitter is operable to transmit on a predetermined communication channel a signal including at least a unique vehicle identifier and a signal indicating the current positional coordinates of the vehicle, and
   the signal processor is operable to analyze the signals received from other vehicles within the communication range, the signal processor configured to include a service table comprising vehicles allowed to perform joint operations,
   wherein the signal processor is further operable to determine from the identifier and the positional coordinates data when another vehicle is ready to perform a joint operation with the vehicle, and
   wherein the signal processor determines that a vehicle is ready to perform a joint operation with another vehicle when the unique identifier included in the service table is identified, speed and direction differences are within specified limits, and the communication system is switched to a different communication channel prior to initiation of a joint operation.

2. The communication system as claimed in claim 1, wherein when two vehicles are ready to perform a joint operation, the operators of both vehicles receive notifications from the wireless communication system, and the joint operation is commenced only after receipt of an instruction from at least one of the two vehicle operators.

3. The communication system as claimed in claim 1, wherein each vehicle only transmits the vehicle's identifier and positional coordinates when it the vehicle is ready to perform a joint operation with another vehicle.

4. The communication system as claimed in claim 1, wherein each vehicle transmits at all times and the transmitted signal includes an indication of the current vehicle status.

5. The communication system as claimed in claim 1, wherein each vehicle is operable to transmit velocity data in addition to positional data.

6. The communication system as in claim 1, wherein the service table further comprises preferred communication channels.

7. A method of providing a wireless communication system between agricultural vehicles, each vehicle including a global positioning system (GPS), a multi-channel transmitter/receiver module having a limited communication range, and a signal processor connected to the transmitter/receiver module, the method comprising the steps of:
   transmitting from each vehicle on a predetermined communication channel
      a signal that at least includes a unique vehicle identifier included in a service table, the service table included in the signal processor and the service table comprising vehicles allowed to perform joint operations, and
      a signal indicating the current positional coordinates of the vehicle, analyzing the signals received from other vehicles within the communication range,
   determining by the signal processor that a vehicle is ready to perform a joint operation with another vehicle by:
      identifying the unique identifier of each vehicle,
      verifying via the unique identifier and the service table that each vehicle is allowed to perform joint operations,
      determining that positional coordinates of at least speed and direction of each vehicle are within specified limits, and
   switching to another communication channel prior to initiation by each vehicle of the joint operation.

8. The method as claimed in claim 7, further comprising the steps of:
   sending notifications from the wireless communication system to the operators of both vehicles only when two vehicles are ready to perform a joint operation, and
   commencing the joint operation only after receipt of an instruction from at least one of the two vehicle operators.

9. The method as claimed in claim 8, wherein each vehicle only transmits the vehicle's identifier and positional coordinates when the vehicle is ready to perform a joint operation with another vehicle.

10. The method as claimed in claim 7, wherein each vehicle transmits at all times and the transmitted signal includes an indication of the current vehicle status.

11. The method as claimed in claim 7, wherein each vehicle is operable to transmit velocity data in addition to positional data.

12. The method as claimed in claim 7, wherein the service table further comprises preferred communication channels.

* * * * *